United States Patent [19]

Magnasco

[11] Patent Number: 5,101,852

[45] Date of Patent: Apr. 7, 1992

[54] LIQUID INTRUSION PREVENTION AND ELIMINATION DEVICE

[76] Inventor: Peter L. Magnasco, P.O. Box 173, Campbell, Calif. 95009

[21] Appl. No.: 556,750

[22] Filed: Jul. 23, 1990

[51] Int. Cl.$^5$ ............................................. F16K 31/22
[52] U.S. Cl. ................................... 137/174; 137/192; 137/202
[58] Field of Search ................ 137/174, 202, 192; 55/168, 170

[56] References Cited

U.S. PATENT DOCUMENTS

| | | | |
|---|---|---|---|
| 2,111,473 | 3/1938 | Hudson | 137/78 |
| 2,555,452 | 6/1951 | McIntyre | 137/174 |
| 2,638,111 | 5/1953 | Wagner | 137/174 X |
| 2,935,990 | 5/1960 | Biddle | 137/202 |
| 3,251,374 | 5/1966 | Smith | 137/174 |
| 3,793,803 | 2/1974 | Winter | 55/218 |
| 4,079,044 | 3/1978 | Franson | 137/203 |
| 4,079,743 | 3/1978 | Weston | 137/202 X |
| 4,135,542 | 1/1979 | Chisholm | 137/204 |
| 4,494,561 | 1/1985 | Ogasawara | 137/204 |
| 4,951,700 | 8/1990 | Kalman | 137/174 |

FOREIGN PATENT DOCUMENTS 1524957 9/1978 United Kingdom ............. 137/174

*Primary Examiner*—Alan Cohan

[57] ABSTRACT

A liquid intrusion prevention and elimination device having a fully controlled output of flow, facilitating; a body having a inlet port communicating to the upper interior of an enclosed chamber, a controlled output port communicating to an output valve having a valve seat accessing the upper interior of the chamber, a discharge port communicating to a discharge valve having a valve seat accessing the lower interior of the chamber, the chamber housing a float having an attached upper float rod with a valve end compatible to the output valve valve seat passing within a plurality of upper finger members, the upper finger members having substantially tapering gaps, therebetween, the valve end being communicatable to the output valve valve seat, the float having an attached lower float rod with a valve end compatible to the discharge valve valve seat passing within a plurality of lower finger members, the lower finger members having substantially rectangular gaps, therebetween, the valve end being communicable to the discharge valve valve seat, the float being buoyantly responsive to accumulated liquids within the chamber accordingly positioning the upper float rod and lower float rod where upward movement of the float towards the output valve causes the output flow to be restricted and accumulated liquids within the chamber to simultaneously begin discharging, the output flow consequently being substantially proportionally redirected impelling the accumulated liquids to be discharged, where continued sufficient upward movement of the float causes the output flow to be entirely terminated.

2 Claims, 4 Drawing Sheets

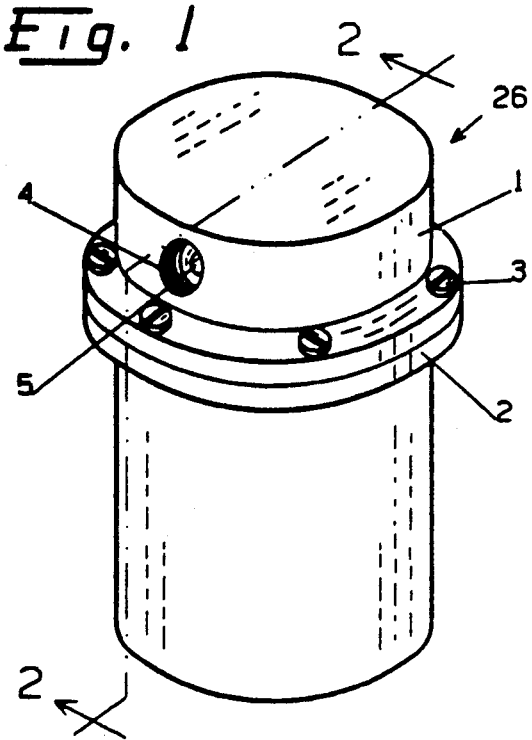
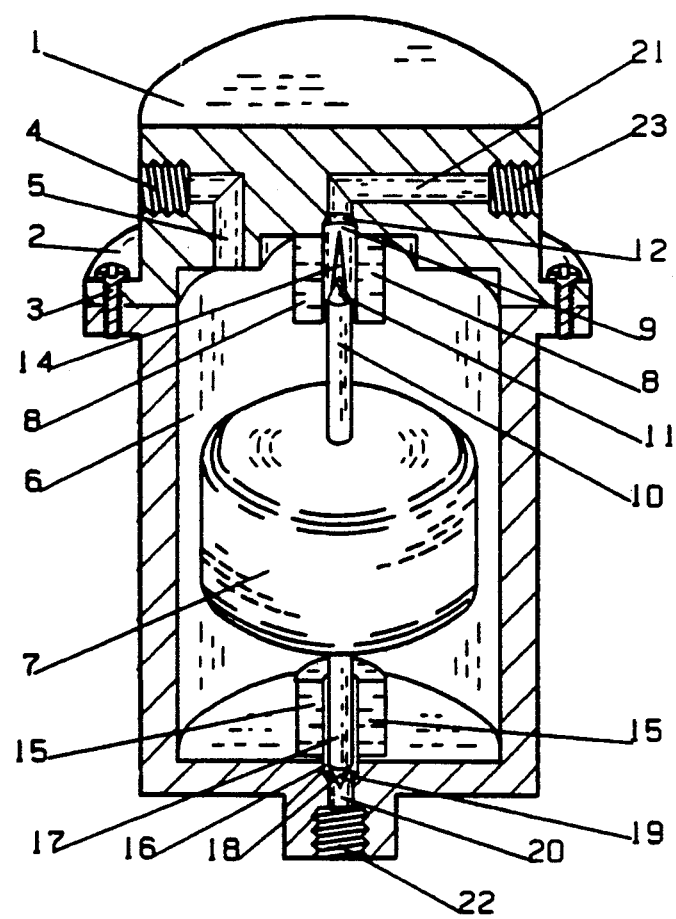

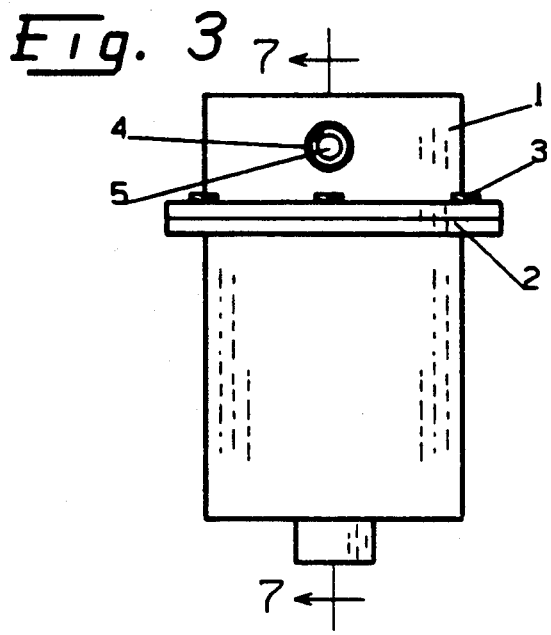
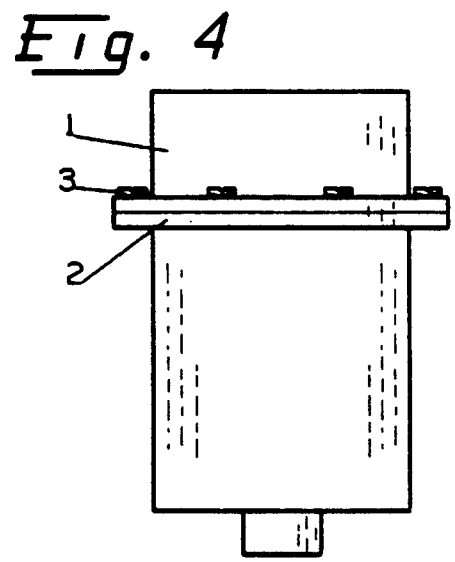
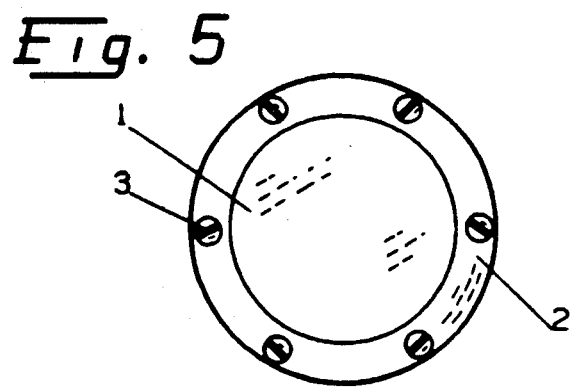
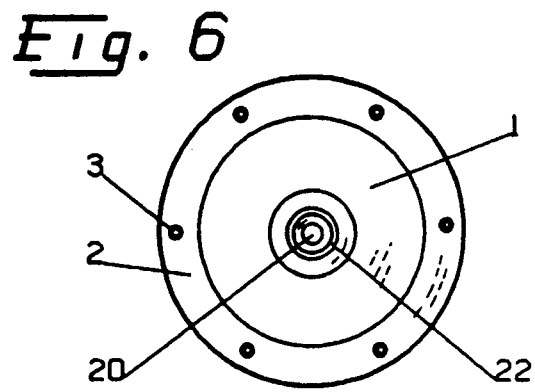

LIQUID INTRUSION PREVENTION AND ELIMINATION DEVICE

BACKGROUND

1. Field of Invention

The invention set forth herein relates to condensate collecting and elimination devices, of the type most commonly found in pneumatic air systems, and is primarily intended to be a dependable protection device for the absolute prevention, and the preclusion, of extensive quantities, of water, or other liquids, from entering to within the lines, and the controls, and the devices and machineries, of a pneumatic system.

Pneumatic air-driven, or dependant machineries, have evolved to be widely accepted and extensively depended upon to perform a multitude of varied and diversified functions in industrial manufacturing, and in many types of commercial operations. In many instances, the widespread use of pneumatic equipment in industry may be attributed unto the fact that it still remains to be one of the most practical ways of performing numerous functions, over any other means. The technology in these systems, particularly in area of pneumatic controls, has become significantly advanced, and is continually being improved upon.

A number of pneumatic systems commonly utilize devices primarily intended to capture, and sometimes expel, liquids that would be potentially extremely harmful to the controls, and machineries, of the pneumatic equipment, before they enter into the pneumatic system, such as condensed water and accumulated oils. These liquids generally tend to accumulate, over a period of time, in the air compression equipment, during the compression of air, or other semi-saturated fluids, of which the pneumatic equipment operation is dependant upon, and would otherwise usually be passed into the pneumatic devices through the inlet lines.

Many, if not most, people knowledgeable in the art would probably agree that one of the principal causes of major failure of pneumatic equipment is the presence of extensive amounts of water, or other liquids, entering within the controls and devices of the pneumatic system. Equipment failures of this type are unnecessary, and many times, through improper equipment operation, result in substantial amounts of lost productivity and wasted energy. This reflects the inability of the common devises to actually prevent extensive amounts of water, or other liquids, from entering to within the pneumatic system.

2. Description Of Prior Art

Heretofore, a variety of devices have been implemented on pneumatic systems to capture, and sometimes expel, liquids before they enter to within the pneumatic equipment.

One such type is a condensate collecting and discharging device having a reservoir, with a rotary valve communicating the reservoir, which is motor driven, so as the reservoir may be drained by operation of the valve as provided by the motor.

Another such type is a drain device to remove collecting water, or other liquids, and sludge, from compressed air systems having a rotor within a housing, the rotor being tunable within the housing, so as to open bleeder valves when the rotor is aligned with a discharge line.

And yet another such type is a drain valve particularly adapted for draining water or other liquids from the bowl of a filter for pneumatic systems. The valve has a stem in a passage which is deflectable by manual bending of the body to unseat the valve, to initiate drainage.

And still yet another such type is a filter device having areservoir which liquids collect within during operation of the pneumatic system. A pressure sensitive piston allows a valve apparatus, being located at the bottom of the reservoir, to open when the air flow is decreased, thereby effecting the discharge of liquids from within the reservoir.

Upon considering the prior mentioned devises, the ability has not been demonstrated to actually prevent the intrusion of extensive amounts of water, or other liquids, from entering to within the devices of a pneumatic system. In a circumstance where the volume of liquid might be larger than these devises could capture, or expel, an extensive amount of liquid would not be prevented from continuing to enter within the devices of the pneumatic system, whereupon in many cases, causing severe malfunction of the equipment, and considerable amounts of wasted energy, through improper equipment operation.

Consequently, it may be seen, that a need exists for a dependable liquid intrusion prevention device primarily intended to actually block, and prevent, extensive amounts of water, and other liquids, from entering within the conceivably sensitive controls and devices of the pneumatic systems, to protect the pneumatic equipment, and to promote efficient operation, and energy consumption.

OBJECTS AND ADVANTAGES

To provide the Liquid Intrusion Prevention And Elimination Device, having a fully controlled output of flow, to block, and absolutely prevent extensive quantities, of water, or other liquids, from entering to within the lines, and the controls, and the devices and machineries, of a pneumatic system.

In addition, I claim the following additional objects and advantages:

To provide such a device to protect the pneumatic equipment from possible harm caused by extensive amounts of liquids entering within the supply lines, and the controls, and the devices and machineries, of a pneumatic system.

To provide such a device to prevent unnecessary equipment failures caused by extensive amounts of liquids entering within the supply lines, and the controls, and the devices and machineries, of a pneumatic system.

To provide such a device to prevent equipment failures, of a pneumatic system, caused by extensive amounts of liquids entering within the supply lines, and the controls, and the devices and machineries, of the system, unnecessarily resulting in lost productivity and wasted energy, through improper equipment operation.

To provide such a device to capture, and expel, water, and other liquids, having a fully controlled output of flow, to preclude liquids from entering within the supply lines, and the controls, and the devices and machineries, of a pneumatic system.

These together with other objects and advantages, will become subsequently apparent, and are more fully hereinafter described and claimed and reside in the following description and accompanying drawings.

DRAWING FIGURES

FIG. 1. Is a perspective elevational view of the Liquid Intrusion Prevention And Elimination Device constructed in accordance with the present invention.

FIG. 2. Is a cross-sectional view taken substantially on a plane passing along line 2—2 in FIG. 1.

FIG. 3. Is a front view, the opposite side being a mirror image.

FIG. 4. Is a side view, the opposite side being a mirror image.

FIG. 5. Is a top view.

FIG. 6. Is a bottom view.

FIG. 7. Is a cross-sectional view taken substantially on a plane passing along line 7—7 in FIG. 3.

FIG. 8. Is a perspective detail view showing the upper finger members.

FIG. 9. Is a perspective detail view showing the lower fingers.

FIG. 10. Is a side detail view showing the float in a lowered position.

FIG. 11. Is a side detail view showing the float in a raised position.

DRAWING REFERENCE NUMERALS

| | |
|---|---|
| 1. Body | 2. Body Flanges |
| 3. Screws | 4. Inlet Port |
| 5. Inlet Passageway | 6. Chamber |
| 7. Float | 8. Upper Finger Members |
| 9. Output Valve | 10. Upper Float Rod |
| 11. Valve End | 12. Valve Seat |
| 13. Flat Float Interior | 14. Tapering Gaps |
| 15. Lower Finger Members | 16. Discharge Valve |
| 17. Lower Float Rod | 18. Valve End |
| 19. Valve Seat | 20. Liquid Outlet Passageway |
| 21. Outlet Passageway | 22. Discharge Port |
| 23. Controlled Outlet Port | 24. Gaps |
| 25. Liquids | 26. Generally Designates The Device |

DETAILED DESCRIPTION OF THE INVENTION

Figure 7:
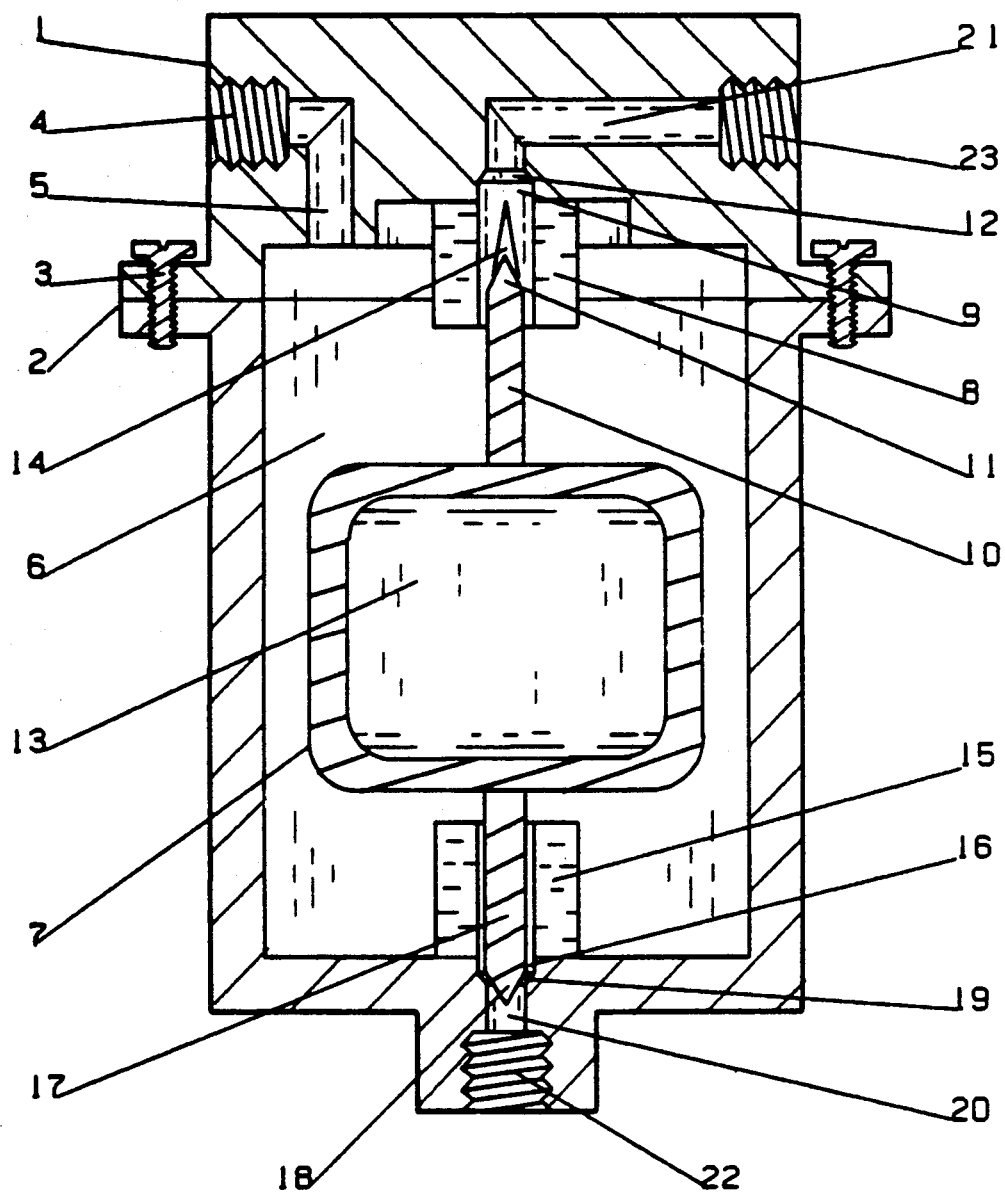
Figure 8:
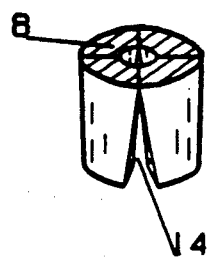
Figure 9:
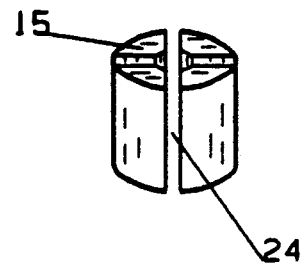

With attention invited to FIG. 1, of the accompanying drawings, in accordance with the present invention a Liquid Intrusion Prevention And Elimination Device 26, is shown having a separable elongated cylindrical Body 1, having a top, a bottom, and having a pair of outer Body Flanges 2, around the outer circumference of the Body 1, near midway along the upper half, of the Body 1, joining the Body 1, together, and coupled by a series of Screws 3, and having a Inlet Port 4, in the upper side, with attention also invited to FIG. 7, of the accompanying drawings, and an opposing Controlled Outlet Port 23, in the opposite side, and a bottom Discharge Port 22, the Inlet Port 4, connecting to a Inlet Passageway 5, communicating to the upper portion of a enclosed elongated cylindrical Chamber 6, being generally centrally located within the Body 1, the Controlled Outlet Port 23, connecting to a Outlet Passageway 21, communicating to a cylindrical Output Valve 9, communicating the upper portion of the Chamber 6, and having a tapering Valve Seat 12, and the Discharge Port 22, connecting to a Liquid Outlet Passageway 20, communicating to a cylindrical Discharge Valve 16, communicating the lower portion of the Chamber 6, and also having a tapering Valve Seat 19, the Chamber 6, housing an elongated cylindrical Float 7, having a hollow Interior 13, the Float 7, having an oppositely attached diametrically aligned elongated cylindrical Upper Float Rod 10, and Lower Float Rod 17, the Upper Float Rod 10, and Lower Float Rod 17, transversing between a plurality of circularly placed, diametrically aligned, evenly spaced Upper Finger Members 8, and Lower Finger Members 15, with attention also invited to FIGS. 8, and 9, of the accompaning drawings, the Upper Finger Members 8, having tapering Gaps 14, therein between, and extending downward from the interior top of the Chamber 6, with the end portion of the Upper Float Rod 10, reaching to extend partially within the diametric center area of the Upper Finger Members 8, and the Lower Finger Members 15, having rectangular Gaps 24, therein between, and extending upward from the interior bottom of the Chamber 6, with the end portion of the Lower Float Rod 17, reaching to extend partially within the diametric center area of the Lower Finger Members 15, the Upper Float Rod 10, having a conically formed Valve End 11, and the Lower Float Rod 17, also having a conically formed Valve End 18, the Output Valve 9, being so aligned with the diametric center area of the Upper Finger Members 8, to enable the Upper Float Rod 10, to pass through the diametric center area of the Upper Finger Members 8, and allow the Valve End 11, of the Upper Float Rod 10, the ability of communication with the Output Valve 9, Valve Seat 12, and the Discharge Valve 16, being so aligned with the diametric center area of the Lower Finger Members 15, to enable the Lower Float Rod 17, to pass through the diametric center area of the Lower Finger Members 15, and allow the Valve End 18, of the Lower Float Rod 17, the ability of communication with the Discharge Valve 16, Valve Seat 19.

DETAILED OPERATION OF THE INVENTION

Figure 10:
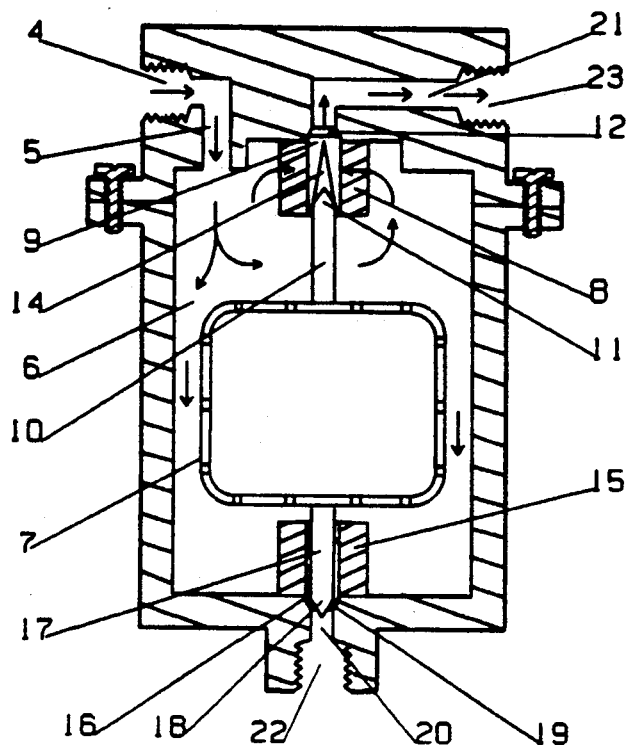
Figure 11:
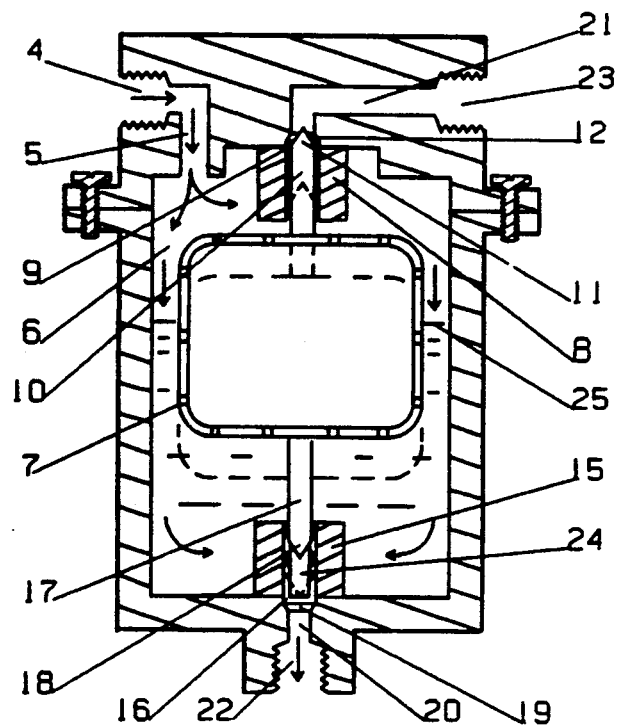

With attention invited to FIG. 10, of the accompanying drawings, the flow of air, or semi-saturated matter, and liquids that may be contained within the flow, enter through the Inlet Port 4, and Inlet Passageway 5, into the interior of the Chamber 6. Liquids within the flow separate from the mainstream and fall to the bottom of the Chamber 6, where they may accumulate, and are precluded from continuing further, or into a pneumatic system, so as a predominately liquid free flow may continue through upper portion of the Chamber 6, through the tapering Gaps 14, with attention also invited to FIG. 8, of the accompanying drawings, between the plurality of Upper Finger Members 8, into the Output Valve 9, through the Valve Seat 12, into the Outlet Passageway 21, and then be released through the Controlled Outlet Port 23. The Float 7, normally rests within the lower portion of the Chamber 6, but is buoyant in the accumulated liquids. With attention now also invited to FIG. 11, of the accompanying drawings, as the volume of the liquids 25, increase within the Chamber 6, the Float 7, is raised by the liquids towards the upper portion of the Chamber 6, having the oppositely attached Upper Float Rod 10, and Lower Float Rod 17, being reciprocally moved within the Upper Finger Members 8, and similar Lower Finger Members 15, according to the movement of the Float 7. As the Float 7, is raised by the liquids, the Upper Float Rod 10, is urged upward within the Upper Finger Members 8, increasingly imposing controlled metered restriction on the flow passing through the narrowing area of the tapering Gaps 14, between the Upper Finger Members 8, by its increased presence within the center of the Upper Finger Members 8, subsequently, producing a corresponding reduction of the flow output, to be released through the Controlled Outlet Port 23, in direct proportion to the volume of the liquids present within the Chamber 6, and simultaneously, as the Float 7, rises, the Valve End 18, of the Lower Float Rod 17, being normally seated in the receptive Discharge Valve 16, Valve Seat 19, preventing discharge, therethrough, when the Float 7, rests within the lower portion of the Chamber 6, is accordingly unseated. Consequentially, as the output of flow is reduced, a proportional redirection of the output of flow is enabled, and then applied towards impelling the volume of the liquids captured within the Chamber 6, to be discharged through the rectangular Gaps 24, as shown in FIG. 9, of the accompanying drawings, between the Lower Finger Members 15, through the Discharge Valve 16, and the Valve Seat 19, into the Liquid Outlet Passageway 20, and through the Discharge Port 22. If the volume of the liquids continue to increase to the point of the Chamber 6, becoming completely filled, and overwhelmed by the liquids, the Float 7, will continue to rise in the liquids until the Valve End 11, of the Upper Float Rod 10, is seated into the Output Valve 9, Valve Seat 12, entirely preventing flow, therethrough, to absolutely prevent the flow of the liquids passing from the Chamber 6, and being released through the Controlled Outlet Port 23, or into a pneumatic system. Once the volume of the liquids 25, have been diminished within the Chamber 6, with attention now resumed to FIG. 10, of the accompanying drawings, the Float 7, may again fall to the lower portion of the Chamber 6, enabling the Lower Float Rod 17, to be lowered within the Lower Finger Members 15, permitting the Valve End 18, of the Lower Float Rod 17, to be resituated in the Discharge Valve 16, Valve Seat 19, ending discharge, therethrough, and the Upper Float Rod 10, to be lowered within the Upper Finger Members 8, allowing the Valve End 11, of the Upper Float Rod 10, to be unseated from the Output Valve 9, Valve Seat 12, enabling flow, therethrough, and full flow to be resumed through the widening area of the tapering Gaps 14, between the Upper Finger Members 8, and be released through the Controlled Outlet Port 23, until according to the volume of the accumulating liquids present within the Chamber 6, repetition of the operation will be initiated.

Readers may ascertain the invention set forth herein is intended to be a reliable liquid intrusion prevention device, and offered according to the problem of the industry, to protect pneumatic devices from possible harm, and aide in preventing unnecessary equipment malfunctions experienced through extensive amounts of liquids entering to within the sensitive controls, and machineries, of the pneumatic system. As the use of pneumatic equipment is extremely essential, and depended upon to perform many varied and diversified functions, in industrial manufacturing, and in commercial applications, the device is also provided to safeguard the equipment operation from failure, needlessly in many instances, resulting in sometimes considerably substantial amounts of lost productivity, and wasted energy.

The foregoing is considered as illustrative only of the principals of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A liquid intrusion prevention and elimination device having a fully controlled output of flow for the absolute prevention and the preclusion of extensive amounts of liquids from entering within the supply lines, the controls and the devices and machineries of a pneumatic air system or similar system, including; a separable elongated cylindrical body, having a top and a bottom and having a pair of outer body flanges around the outer circumference of said body joining said body together near midway along the upper half and being coupled by a series of screws, and having an inlet port which is threaded to accept a conduit, in the upper side, and an opposing governed controlled outlet port which is also threaded to accept a conduit in the opposite side, and a bottom discharge port which is threaded to accept a conduit, said inlet port connecting to an inlet passageway communicating to the upper portion of an enclosed hollow elongated cylindrical chamber, said chamber being generally centrally located within said body, the said controlled outlet port connecting to an outlet passageway communicating to a cylindrical regulated output valve communicating the upper portion of said chamber and having a tapering valve seat, said discharge port connecting to a liquid outlet passageway communicating to a cylindrical discharge valve communicating the lower portion of said chamber, and also having a tapering valve seat, said chamber housing an elongated cylindrical float, said float having an oppositely attached diametrically aligned and elongated cylindrical upper float rod and similar lower float rod, said upper float rod and said lower float rod transversing between a plurality of circularly placed, diametrically aligned, evenly spaced upper finger members and lower finger members, said upper finger members having tapering gaps therebetween and extending downward from the interior top of said chamber with the end portion of said upper float rod reaching to extend partially within the diametric center area of said upper finger members, said lower finger members having rectangular gaps, therein between and extending upward from the interior bottom of said chamber, having the end portion of said lower float rod, reaching to extend partially within the diametric center area of said lower finger members, said upper float rod end portion having a valve end thereon which is conically formed, said lower float rod end portion also having a valve end thereon which is also conically formed, said output valve being substantially so aligned with the diametric center area of said upper finger members to enable said upper float rod valve end the ability of communication with said output valve valve seat, and said discharge valve being substantially so aligned with the diametric center area of said lower finger members to enable said lower float rod valve end the ability of communication with said discharge valve valve seat, wherein, being so as a flow of air, or semi-saturated matter, and liquids that may be contained within the input of a flow enter said inlet port and continue through said inlet passageway to within the interior of said chamber where infinite amounts of the liquids within the flow separate and fall to the bottom and continue to accumulate within the interior of said chamber and are thereafter distinctly precluded from continuing further with the mainstream of flow continuing through the upper portion of said chamber, through said tapering gaps between the plurality of said upper finger members where the output of flow may then be controllably allowed to pass through said output valve and be released through said controlled outlet port, and while during the accumulation of liquids within said chamber, said float rests within the lower portion of said chamber but is buoyant in the accumulated liquids so as the volume of the liquids increase within said chamber, said float is raised by the liquids towards the upper portion of said chamber having the oppositely attached said upper float rod and said lower float rod being reciprocally moved within said upper finger members and said lower finger members according to the movement of said float and as the said float is raised by the increasing liquids the said upper float rod is urged upward within the diametric center area of said upper finger members increasingly imposing controlled metered restriction on the flow passing through the narrowing area of said tapering gaps between said upper finger members by its increased presence therein, being so as to subsequently produce a substantially corresponding reduction in the output of flow to be released through said controlled outlet port in direct proportion to the volume of the accumulating liquids present within the said float chamber, and according with raising of said float, and simultaneously, said lower float rod is lifted upward within said lower finger members and the said valve end of the said lower float rod being normally seated in the said discharge valve, said valve seat, and preventing discharge therethrough when said float rests within the lower portion of the said chamber is accordingly unseated being so as a proportional redirection of flow is enabled and then applied towards impelling the volume of accumulating liquids captured within said chamber to be discharged in flowing through said rectangular gaps between the said lower finger members and continuing through said discharge valve into said liquid outlet passageway and through said discharge port and where accordingly if the volume of the liquids continue to accumulate to the point of said chamber becoming completely filled and overwhelmed by the liquids the said float being to continue to rise in the liquids until the said valve end of the said upper float rod is seated into said output valve, said valve seat, so as to entirely block flow therethrough, being to fully control and absolutely prevent the flow of the liquids passing from the said chamber and beyond said output valve and being released through said controlled outlet port, and once the volume of the liquids have been diminished within the said chamber the said float being to again fall to rest within the lower portion of the said chamber enabling the said lower float rod to be lowered within the said lower finger members and the said valve end of the said lower float rod to be resituated in the said discharge valve, said valve seat ending discharge through said discharge port, and said upper float rod to be lowered within said upper finger members so as the said valve end of the said upper float rod is unseated from the said output valve, said valve seat enabling flow to be resumed therethrough and full flow to be enabled through the widening area of the said tapering gaps between said upper finger members and be released through said controlled output port, so as according to the volume of the accumulating liquids present within the said chamber repetition of the operation will be initiated.

2. A liquid intrusion prevention and elimination device, having a controlled output of flow, including; a body, having a inlet port, a governed controlled outlet port, and a discharge port, said inlet port communicating to the upper portion of a enclosed chamber being generally centrally located within said body, said controlled outlet port communicating to a regulated output valve communicating the upper portion of said chamber, and having a valve seat, which is tapered, said discharge port communicating to a discharge valve communicating the lower portion of said chamber, and also having a valve seat which is also tapered, said chamber housing a float, said float having an oppositely attached substantially diametrically aligned elongated cylindrical upper float rod, and similar lower float rod, said upper float rod and said lower float rod transversing between a plurality of generally circularly placed, diametrically aligned, evenly spaced upper finger members, and lower finger members, said upper finger members having substantially tapering gaps therebetween and extending generally downward from the interior top of said chamber, the end portion of said upper float rod reaching to extend partially within the diametric center area of said upper finger members, said lower finger members having substantially rectangular gaps therebetween, and generally extending upward from the interior bottom of said chamber, the end portion of said lower float rod reaching to extend partially within the diametric center area of said lower finger members, said upper float rod end portion having a valve end thereon which is conically formed, said lower float rod end portion having a valve end thereon, which is conically formed, said output valve being substantially so aligned with the diametric center area of said upper finger members to enable said upper float rod valve end the ability of communication with said output valve valve seat, and said discharge valve being substantially so aligned with the diametric center area of said lower finger members to enable said lower float rod valve end the ability of communication with said discharge valve valve seat.

* * * * *